United States Patent [19]

Hamon

[11] Patent Number: 4,612,054
[45] Date of Patent: Sep. 16, 1986

[54] CARBODIIMIDE DRIERS FOR RESIN COATING COMPOSITIONS

[75] Inventor: Ray C. Hamon, Macon, Ga.

[73] Assignee: Ashland Oil, Inc., Ashland, Ky.

[21] Appl. No.: 712,823

[22] Filed: Mar. 18, 1985

[51] Int. Cl.$^4$ ............... C09D 5/08; C09D 3/64; C09D 3/58; C09D 3/54
[52] U.S. Cl. ....................... 106/264; 528/274; 528/295.5; 428/418; 428/425.8; 428/458; 428/460; 428/461
[58] Field of Search ............ 106/264; 528/274, 295.5; 428/418, 425.8, 458, 460, 461

[56] References Cited

U.S. PATENT DOCUMENTS

| | | | |
|---|---|---|---|
| 2,430,479 | 11/1947 | Pratt et al. | 154/140 |
| 3,644,234 | 2/1972 | Grieve | 521/113 |
| 4,038,225 | 7/1977 | Takaya et al. | 106/264 |

Primary Examiner—Ronald W. Griffin
Attorney, Agent, or Firm—Richard C. Willson, Jr.

[57] ABSTRACT

New coating compositions having controllable drying time and capable of drying rapidly at ambient temperatures without substantial evolution of gaseous by-products caused by conventional driers such as melamines or urea formaldehyde comprising carbodiimides or homologies of carbodiimides together with organic carboxylates. These compositions are particularly useful in providing fast-drying long-oil alkyds which form coatings exhibiting excellent hardness, toughness and resistance to humidity and salt spray.

17 Claims, No Drawings

CARBODIIMIDE DRIERS FOR RESIN COATING COMPOSITIONS

BACKGROUND OF THE INVENTION (1) Field of the Invention

The present invention relates generally to the field of coatings compositions generally classified in class 106 and/or class 428 of the U.S. Pat. and Trademark Office classification system.

This application relates to the general field of copending U.S. Ser. No. 382,853 filed May 24, 1982, now abandoned.

(2) Description of the Prior Art

The known art for drying or curing resins including principally alkyd resins comprises metal-catalyzed oxidation reactions through the unsaturation of the body of the resin polymer. These conventional types of drying agents have been used for many years and the research is voluminous on this subject. The oxidative process is very useful and produces most of the alkyd coatings used commercially today. However, the oxidative process has always been limited by the concentration of the unsaturation of the resin polymer. Therefore, a very long or long oil type alkyd (e.g. produced using more than 60% by weight of the fatty acid oil) could not be satisfactorily cured by the oxidative method. Even medium length alkyd polymers are hindered by the oxidative curing process because of the time required and the heat energy and heating apparatus necessary to shorten the cure time to meet commercial production schedules. The higher molecular weight alkyd resins of the very long to medium long oil types are conventionally caused to dry by cross linking them by the addition of melamine type driers and/or substitution of urea-formaldehyde type resins. Such formulations also require high energy levels for cure and involve up to several minutes of dwell time in the oven (e.g. 10 minutes at about 400° F. to 7 days at temperatures of 200° F.). These melamine and urea-formaldehyde cured alkyd systems also give off toxic formaldehyde.

In contrast, the present carbodiimide driers become totally a part of the alkyd resin and the systems of the present invention do not produce odors, fumes, or evolution of toxic or corrosive substances through the atmosphere, other than the natural evaporation of whatever solvent is chosen for use with the system of the invention.

The literature contains many teachings of preparation of carbodiimides and polycarbodiimides.

U.S. Pat. No. 3,755,242 to Reich (Class 524, subclass 437) teaches preparation of isocyanade-terminated high molecular weight polycarbodiimides.

U.S. Pat. No. 3,450,669 to Nolen (Class 524, subclass 133) teaches use of carbodiimides as a stabilizer for polyesters, polyethers and polymethanes.

U.S. Pat. No. 2,430,479 to Pratt et al (Class 154, subclass 140) teaches the use of polycarbodiimides as adhesives and adhesive modifiers.

It is known that many carbodiimides and polycarbodiimides moieties are formed in the production of copolymer foams utilizing the reaction of organic polyiscyanurates with polycarboxilic compounds.

U.S. Pat. No. 3,644,234 to Grieve (Class 260, subclass 2.5) and U.S. Pat. No. 3,723,364 to McLaughlin et al (Class 521, subclass 157) teach the above production of copolymer foams.

U.S. Pat. No. 4,118,536 to Beardsley et al (Class 427, subclass 385) teaches the use of carboxidiimides as primers and as ingredients in composite coatings.

West German DT-OS No. 2,655,836 now U.S. Pat. No. 4,060,664 (assigned 3M), class 156, subclass 331.1 discloses a novel adhesive composite coating wherein the intermediate layer is comprised of polymeric polycarbodiimides.

U.S. Pat. No. 3,556,829 to Gebura (CLass 106, subclass 288) discloses the use of carbodiimides to modify clays used in coating manufacturing.

U.S. Pat. No. 3,619,236 to Dappen et al (Class 430, subclass 621) teaches use of carbodiimides with gelatin and carboxyl-containing polymers as a support to provide photographic materials of improved dimensional stability.

All of the above references show the benefits of the carbodiimide moieties in coatings of many different types. However, none of these references teaches or suggests that the carbodiimides, polycarbodiimides or substituted carbodiimides are excellent driers for alkyd resins, polyesters, polyacrylate-type polymers or any of the resins or polymers that contain carboxylate groups having at least one active (labile) hydrogen molecule.

The driers of the present invention provide cross-linking for the alkyd type resins, polyesters, polyacrylates, modified vinyl-acrylics, epoxides, urethanes and polyurethanes, metal salts, e.g., Ca, Co, Cu, Pb, Mn, Ti, Zr, salts of acids and the melamines, urea-formaldehyde, aziridines and peroxides are the most conventional driers presently used. All of these conventional driers have some disadvantages; the metal salts in many cases cause slow drying, require heat or combination of long drying time plus heat to obtain thorough cure or drying. The melamine types all give off formaldehyde and most require relatively long curing periods at ambient temperatures. The aziridines are toxic and hydrolize easily in water systems and have relatively short shelf life or storage time. The organic peroxides are hazardous and require special handling and storage and only work for a free-radical polymerization. The urea formaldehyde types require high energy for cure and give off formaldehyde during cure.

In contrast, the carbodiimides, polycarbodiimides and substituted carbodiimides of the present invention avoid all of the above disadvantages.

From the above review of the art, it is apparent that the driers and cross-linking agents conventionally used today do not produce finished products with all the properties desired. Many attempts have been made to dry alkyd resins at ambient room temperature in relatively short periods of time. Those familiar with the art know that new driers are needed that will cause the alkyd resins to harden and present water resistance in a short time. The carbodiimides and related compounds described in this invention impart those desired properties to the alkyd polymers and copolymers.

SUMMARY (1) General Statement of the Invention:

The present invention involves the discovery that carbodiimide driers, including polycarbodiimides and substituted carbodiimides provide fast drying coatings even at ambient temperatures and even using relatively long oil, alkyd resins high solids alkyd, polyester and acrylic resins and, further provide coatings which rapidly become firm, tough, hard and resistant to moisture and salt spray. Additionally, the driers of the present invention do not give off noxious or other by-products produced by the drying mechanism thus minimizing difficulties with pin-holing, corrosion of coated parts and apparatus, and holidays.

These driers are applicable for any class of polymers or compounds that have carboxylic groups containing at least one active hydrogen.

While not wishing to be held to any theory or mechanism of the present invention, the general reaction appears to follow the following:

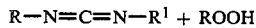

R—N=C=N—R$^1$ + ROOH

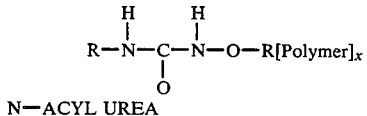

$$R-\underset{\underset{O}{|}}{\overset{H}{\underset{|}{N}}}-\overset{H}{\underset{|}{N}}-O-R[Polymer]_x$$

N—ACYL UREA

Where R and R$^1$ are hydrocarbon or hydrocarbon substituted with groups which do not interfere with the above reaction; preferably as described infra.

(2) The Utility of the Invention:

As mentioned above, the invention provides valuable coating formulations having excellent hardness, toughness, humidity and salt spray protection and good storage stability and capable of rapid drying at ambient temperatures without evolution of by products.

DESCRIPTION OF THE PREFERRED EMBODIMENTS

Starting Materials

Carbodiimides and Related Compounds:

As described above, the carbodiimides of the present invention can be carbodiimides, substituted carbodiimides, polycarbodiimides and substituted polycarbodiimides.

The preferred carbodiimides are those produced by the techniqures of U.S. Pat. Nos. 2,938,892 and 3,135,748. Suitable carbodiimides and related compounds are available from Union Carbide Corporation of Danbury, Conn. under the tradename "UNEL Cross-linking Agent" with preferred cross-linkers being designated by Union Carbide as "UNEL XL 20" and "UNEL XL 20E".

For water systems, the carbodiimides are preferably purchased or prepared as a water-based emulsion. For organic solvent based systems, the preferred form is the amyl acetate solution of the carbodiimide or mixed acetate solutions of lower flash points or the related compound. Both of these forms are available from the aforementioned Union Carbide Corporation.

The coating composition can contain about 0.1 to about 40% by weight of the carbodiimide or related compound, more preferably from about 0.5 to about 25% and most preferably from about 1 to 15% of the carbodiimide or related compound.

All percents given herein are percents by weight based on the dry weights of the materials excluding the weights of solvents unless otherwise expressly stated.

The carbodiimides of the invention are represented by the formula:

R—N=C=N—R'

Where R and R prime may be symmetrical or asymetrical, alkyl or aryl, aliphatic or dialiphatic and the aryl and aliphatic groups may be substituted or unsubstituted with halogens, cyano, nitro, amino, alkylamine, alkoxy carbonyl or other substituents which do not interfere with the reactions of the invention e.g. by steric hindrance or causing competing side reactions. R and R' preferably contain from about 30 to 75, more preferably from about 55 to about 65 and most preferably from 45 to about 60 carbon atoms.

The carbodiimides of the present invention include, inter-alia, any of the compounds that are conveniently prepared by the techniques disclosed in U.S. Pat. No. 2,938,892 to Sheenan (Class 260, subclass 112) and U.S. Pat. No. 3,135,748 to Little (Class 544, subclass 164).

R and R' may alternatively be aromatic and hetrocyclic components substituted with any of the above stated classes of substituents.

Resins:

Suitable resins can be alkyds e.g. preferably those available from Cargill under the brand name "7472"; Spencer-Kellogg under the brand name "9706" or 3907GB74 under the brand name "KELSOL" polyesters including preferably those available from Reichold Chemicals Co. under the brand name "BECKOSOL" and particularly those available from Ashland Chemical Company of Columbus, Ohio under the designation ARAPOL; acrylics including preferably those available from ROHM & HAAS under the designation "Rhoplex"; epoxides including preferably those available from Cargill under the designation "Resin Code 1161, 1162, 1170, 1202–1206"; phenolics including preferably those available from Union Carbide under the designation "Ucars"; modified acrylics including preferably those available from Union Carbide under the designation "Ucars"; modified vinyls and urethanes including preferably those available from WITCO under the designation "Castomer". Other resins which can conventionally be substituted for the above resins will also be applicable to the formulations to the invention.

The resins must contain one or more carboxylate groups containing active hydrogen(s) and can be selected according to the criteria generally skilled in the art of coating compositions.

The carboxylate will preferably be present in at least the stoichiometric quantity required to react with the drying agent, including the carbodiimides and related compounds together with any other drying agent which might be add mixed to provide a special formulation. (It is a feature of the present invention that the carbodiimides do not interfere with the function of the conventional drying agents which may be useful with the formulation and maybe added to these drying agents.) Alternatively, in special formulations the carbodiimides or related compounds may be substituted for conventional drying agents.

The organic carboxylate resins will preferably be present in the formulation in an amount of about 1.0 to about 99.5% by weight (dry basis), more preferably from about 15 to about 60% and most preferably to about 2.0 to 20%.

Other Drying Agents:

As mentioned above, other conventional drying agents may be utilized in conjunction with the carbodiimides though they are not necessarliy required. Such drying agents can include all of those conventionally known to the art including metal driers such as the metal type driers mentioned under "Background of the Invention."

Resins-Polyol Esters

The esters useful for the present invention are preferably polyfunctional esters of carboxylic acids, preferably of fatty acids having 6 to 30 carbons. Mono-esters may find occasional use in special circumstances. Particularly preferred are the polyesters of naturally-derived fatty acids such as organic acid esters of glycerin, coconut oil, tall oil, soya oil acids, stearic acid, preferably, isostearic acid, oleic acid, linoleic acid and polyols, e.g. neopentylglycol, trimethylol propane and pentaerythrol. Most preferred is the dilanolinic acid ester of pentaerythritol.

Useful commercial polyol esters comprise: "Pentalan" from Croda Chemical Company of England, a tetrahydric lanolin alcohol; Degras manufactured by Emory Industries of Linden, N.J., and FAI manufactured by Azirona Chemical of New York City.

The quantity of esters employed with the present invention will not be narrowly critical and will depend to a substantial degree on the other ingredients and their amounts as selected for the particular formulation. Preferably the compositions will contain from about 5% to about 95%, more preferably from about 5% to about 10% and most preferably from about 8% to about 12% percent esters based on the total weight of the esters as compared to the total dry weight of the formulation. In most cases, the acid number of the polyester will be determined and from about 50 to 110% of stochiometric amount of carbodiimide (more preferably about 70 to 100 and most preferably 80 to 95%) will be added.

Surfactants (optional)

Surfactants useful with the present invention include natural surfactants such as salts of oleic acid, e.g. morpholine salts of oleic acid, or the similar salt or triethanolamine and entirely synthetic surfactants such as alkanol amide, e.g. Tamol 850 (Rohm & Haas, Philadelphia) or Igepals (GAF Corp. NYC) or WHC by Stephan Chemical Company of Chicago, Ill. (oleyl diethanol amide), sorbitan monooleates manufactured by ICI America of Wilmington, Del., isostearic acids salts, coconut oil salts, lauric acid salts and the like. Excess carboxylic acid, e.g. in wax components, can react with amines in situ to form salts which act as surfactants. The preferred range is about 2 to 8% carboxylic acid and about 1 to 5% amine. All or part of the surfactant can be organic sulfonates, e.g. alkyl lauryl sulfonate or alkyl benzene sulfonates.

Suitable surfactants comprise the reaction products of amines such as morpholine, thiethanolamine, ammonia, diethanolamine and ethanolamine with carboxylic acids such as those mentioned above. The compositions of the present invention will generally include surfactants in the amount of from about 0.1 to 15%, more preferably from about 0.5 to about 5% and most preferably from about 1 to 2 percent by weight based on the dry weight of the formulation. However, this will vary in response to the selection and quantities of the other ingredients employed.

Coupling Agents:

Coupling agents can be used with the invention. Preferred coupling agents comprise $C_5$-$C_{30}$ liquid hydrocarbon components with $C_2$-$C_{20}$ alcohol in a weight ratio of between 1:1 to 10:1.

Several types of coupling agents can be employed with the invention including mineral spirits, e.g. ethylene glycol ethers, preferably butyl and propyl ethers; hydroxy ethers (ether-alcohols), such as propyl cellosolve, (Ektasolve EP manufactured by Eastman Kodak of Rochester, N.Y.) diethylene glycol monoethyl ether, monopropyl ether of ethylene glycol, propyl cellosolve, ethyl cellosolve, and diethylene glycol monoethyl ether and other coupling agents which will be evident to those skilled in the art for use in specialized formulations according to the present invention. The coupling agent is selected by physical test; substituted alcohols or hydrocarbons and anything which does not interfere with the formulations of the present invention and which renders their ingredients mutually soluble in the water base will generally be acceptable.

Alcohol ether-esters may also be used e.g. ethylene glycol monoacetate, diethylene glycol monoproprionate, diethylene glycol monoacetate and propylene glycol monoacetate.

Alcohols, such as ethanol, isopropanol and isobutanol will generally be useful as coupling agents for the invention. Other commercial coupling agents which are useful with formulations of the present invention include: Ektasolve EP, manufactured by Eastman Kodak of New York, and Propasol P, manufactured by Union Carbide of Danbury, Conn.

The coupling agents of the present invention will generally be employed in quantities of from about 5 to about 35% or more, more preferably from about 8 to about 25% and most preferably from about 10 to about 20% based on the dry weight of the formulation. In addition to acting as a coupling compound, the coupling agent will usually be useful during the drying and curing process after application of the coatings composition of the present invention to substrates. For example, when carefully selected, the coupling agent will form an azeotrope with the water present in the formulation, thus increasing volatility, speeding cure, and providing a more permanent coating. Some coupling agents will assist the final coating in other ways, e.g. by providing leveling of the final coating, avoiding pinholes, and providing a more continuous, better quality dry film.

In organic-solvent based formulations, the coupling agent can serve as part or all of the solvent.

Water:

Deionized water will preferably be employed with the formulations of the present invention which are water based in order to prevent reaction of chlorine, calcium, magnesium or other components of tap water from interfering with the formulations of their curing. Distilled water could, of course, be employed but will general be avoided for economic reasons.

Solvents:

Conventional solvents, e.g. amyl or butyl acetates, ketones (MEK, etc.), acetone, alcohols mineral spirits and the like can be used with those formulations of the invention which are organic solvent based.

Those formulations of the present invention which are water-based will generally contain a minimum of about 8%, more preferably 10% and most preferably 50% or even more of water based on the total weight of the formulation. As the formulations of the present invention are generally classifiable as oil-in-water emulsions of special character, a quantity of water greater than about 92% may cause swelling and loss of wetting properties in most of the formulations of the present invention although specialized formulations utilizing carefully selected non-aqueous ingredients may tolerate water up to an amount of 97% by weight based on the weight of the total formulation.

pH:

The pH of this system will be preferably in the range of 7 to 10 with 8 to 9 being preferred. The nature of the system will depend heavily upon the amount of soap produced when the emulsifying agent (fatty acid) is neutralized with an alkaline material (e.g. amines, triethanolamine, morpholine). One should slightly overbase (make alkaline) the system to obtain maximum production by reacting any residual acids which may be left over at the normal end point of titration.

Techniques in Mixing:

Apparatus: The apparatus for the present invention will be that conventionally utilized in the preparation of coatings compositions, e.g. kettles and mixing tanks having flow metering or measuring devices and agitation means, e.g. pumps mounted on side-arms connecting with the main vessel, internal stirrers, contra-rotating shearing devices and any of the other available devices which are well known to the art.

Temperature: The temperature during mixing may be different during different stages in the formulation. In general the water will be at about room temperature, the non-aqueous ingredients will be transferred and mixed together at about room temperature. However, temperatures are not narrowly critical and will vary to provide faster mixing or better compatibility of ingredients according to observation of those skilled in the art. For example, pressure vessels may be utilized for the purpose of lowering ingredient melting and boiling points, where useful, in order to provide better dispersion of difficult-to-mix ingredients.

Mixing Procedure: While the formulations of the present invention may be manufactured continuously if desired, batch techniques will be more usually employed. For example, see Example No. 1. The carbodiimide or related compound wax, if any, esters, surfactants, coupling agents and any other non-aqueous ingredients are fed to the same vessel with the various non-aqueous ingredients being added slowly while the vessel is agitated with conventional mixer. In most cases, the esters will be added with the carboxylic acids; the neutralizing ingredient, e.g. morpholine, triethanolamine, will be added after the other ingredients have been thoroughly mixed. After neutralization, which is generally visually observable as a distinct increase in viscosity, the non-aqueous ingredients are allowed to mix for 15 to 30 minutes and transferred over to the aqueous phase, which is agitated during the addition of the non-aqueous phase. Generally, the carbodiimide or related compound is added last, as an oil-in-water emulsion (for water-based formulations) or as a organic solvent solution (for organic solvent-based formulations). The finished formulation is allowed to cool with preferably constant, agitation, after which the formulation is drawn off into shipping containers, e.g. tank cars, tank trucks, drums or smaller cans.

Quality Control:

The finished formulation, prior to packaging will generally be checked for pH, solids content, freeze-thaw stability, corrosion-protection under accelerated conditions and other tests utilizing techniques well known to the coatings industry.

Application:

The formulations of the present invention may be applied to substrates to be protected by conventional application techniques, such as spraying, brushing, roller-coating, dipping, flow-coating, electrostatic airless spraying, etc. Coating thickness can be varied by changing the formulation, the number of coats, or the amount applied per coat but in general will be in the range from about 0.5 mils to about 10 mils per coat after drying.

EXAMPLES

Example 1

(Reference B1346—1 to 3)

(Formulation according to the invention providing a good storage life and long term protective coating). 24.935 parts of deionized water are charged to a conventional mixing kettle of a high sheer disperser (type cowles dissolver). The water agitating at low to moderate speed add 0.598 parts of 28% ammonium hydroxide, 0.199 parts of anti-foam, 1.297 parts of anionic surfactant, 0.359 parts of non-ionic dispersant, 1.995 parts of ethylene glycol and 19.948 parts of "Kelsol" resin 3907-BG-74. Mix at low to moderate speeds at ambient temperatures until the mixture is uniform and a homogenous solution. To this agitating mixture is added 29.922 parts of an organic phosphate pigment, 9.974 parts of a zinc oxide pigment, 9.974 parts of a finely ground mica and 0.798 parts of a finely divided fungicide or mildiside. Disperse all of the components at high speed agitation long enough to make a dispersion that has a finesse of dispersion reading of 5-7 on a Hegman gauge. Due to the energy put into the system by the high speed agitation the temperature will probably rise to as much as 70° C. but should be controlled to assure that the temperature does not rise any more than a maximum of 70° C. The solids contact of this pigment dispersion is found to be about 66.2%.

The above referenced pigment dispersion is diluted with the following components using moderate agitation to produce a coating with good flexibility, solvent resistance and adhesion to cold rolled steel. 14.929 parts of the pigment dispersion B1346-1 was mixed with 17.627 parts of red oxide, 56.130 parts of acrylic latex, 5.051 parts of butyl cellesolve, 0.126 parts of anti-foam and 6.138 parts of UNEL XL-20 cross linking agent from Union Carbide, a corporation of Danbury, Conn. This paint is found to have a pH value of 7.8, a viscosity of 4,620 centapoises at 77° F. (determined using a Brookfield viscometer using spindle number 3 rotating at 10 rpm) and a calculated weigh solids of about 48.6%.

Cold rolled steel panels ($O_2$-panels) are coated with the paint (using a conventional air spray gun for coatings) at a wet thickness of about 5 mils. The dry coating thickness is measured to be about 2 to 2.5 mils thickness. A part of the panels are air dried at ambient room temperatures and same dried at 200° F. for 5 minutes in a forced convection oven. The air dried panels after 16 hours are tested for methyl ethyl ketone (MEK) resistance by wetting a pad of clean cheese cloth with the MEK and with moderate pressure (about 5 pounds per square inch) rubbing it across the air dried coating and counting the number of double strokes (across the coating and back) required to expose the steel substrate. The following test results are obtained:

| Film Thickness in Mils | Conditions Drying | UNEX XL-20 Cross Linked | ⅛" Mandrel | MEK Resistance Double Rubbs | Tape Adhesion |
|---|---|---|---|---|---|
| 2.1 | 2-2.5 | Air Dry 16 Hrs. | No | Pass | 5-12 | 100% |
| 2.2 | 2-2.5 | Air Dry 16 Hrs. | Yes | Pass | 52 | 100% |
| 2.3 | 2-2.5 | 200° F. 5 Min. | No | Pass | 12-15 | 100% |
| 2.4 | 2-2.5 | 200° F. 5 Min. | Yes | Pass | 300+ | 100% |

Example 2

(Reference: B1346—4, 5, & 7

A formulation is prepared using the same procedures and equipment as in Example I using 18.045 parts of deionized water, 1.113 parts of surfactant anionic, 0.361 parts 28% ammonium hydroxide, 18.045 parts of Kelsol 3907-BG-74 alkyd resin, 24.06 parts of molywhite 212 pigment, 6.015 parts of a zinc phosphate pigment, 3.008 parts of Mica, 12.030 parts of calcium carbonate, 6.015 parts of zinc oxide pigment, 0.301 parts of fungicide or mildewside, 3.008 parts of ethylene glycol, 0.120 parts of anti-foam and 7.880 parts of a carbon black dispersion, giving a calculated total solids of 67.34%. An aliquot of this concentrate is diluted to prepare a paint as follows: pigment dispersion 30.081 parts, thickening agent 14.476 parts, filming aid 3.909 parts, anti-foam agent 0.289 parts, modified acrylic polymer dispersion 43.529 parts and a drying agent 7.716 parts. Prepared samples on O₂-panels as in Example I for testing are compared with the results with a similar coating that was cross-linked with a melamine type cross linking agent.

| No. | Dry Film Thickness | Coating Cure Conditions | Drier or X-Linker | MEK Resistance | Corrosion Salt Fog Resistance |
|---|---|---|---|---|---|
| 1 | 2 mils | 24 hr. ambient | XL-20 | 52 | — |
| 2 | 2 mils | 72 hr. ambient | XL-20 | 187 | 162 hrs. (5% rust) |
| 3 | 2 mils | 180° F. 5 min. | XL-20 | 300+ | — |
| 4 | 2 mils | 200° F. 5 min. | XL-20 | — | 260 hrs. (5% rust) |
| 5 | 2 mils | 24 hrs. ambient | melamine | 23 | — |
| 6 | 2 mils | 180° F. 5 min. | melamine | 45 | 72 hrs. (5% rust) |
| 7 | 2 mils | 72 hrs. ambient | melamine | 50 | 16 hrs. (50% rust) |

Example 3

(Reference B1346—15)

A formulation is prepared using the same procedure and equipment as in example number I. 19.755 parts of a "Kelsol" resin (a Spencer Kellogg Division of Textroh Inc.), 1.534 parts of an amine, 25.566 parts of water, 25.566 parts of an acrylic copolymer dispersion, 23.725 parts of a lead containing pigment and 3.835 parts of a polycarbodiimide drier. This paint had a pH of 8.34, viscosity of 760 centepoises at 74° F. at 10 rpm using spindle no. 3 and a Brookfield viscometer model RVT, and a calculated total solids by weight of 54.45%.

Coatings prepared an O2-panels FM testing as in previous examples. Had to spray two coats to build a 2 mil dry film thickness.

| Coating Curl No Conditions | MEK Resistance | 100% Relative Humidity at 110° F. | 5% Salt Fog Resistance |
|---|---|---|---|
| 1 Ambient Temp. 72 hrs. | 36 | 2000 hrs. | — |
| 2 Ambient Temp. 72 hrs. | 10 | — | — |
| Control Sample No. XL-20 | | | |
| 3 Coating Without XL-20 Cured 5 min. at 200° F. | 15 | — | — |
| 4 Cured 5 min. at 200° F. | 100 | 2000 hrs. | 1700 hrs. (no rust) |

Example 4

(Reference B1346—16)

A formulation using the same procedure and equipment as in Example 1; 23.295 parts of an alkyd resin about 75% solids and produced by Spencer Kellogg Division of Textron, Inc. called "KELSOL" and having an acid number of about 40. 3.764 parts of triethylamine, 11.293 parts of an organic polyphosphate inhibiting pigment, 3.764 parts of a chromate containing pigment, 1.506 parts of carbon black, 41.861 parts of an acrylic copolymer dispersion and 14.516 parts of a poly carbodiimide drier. This produces a very thick smooth paste that dilutes readily with water to the viscosity needed for application. pH equals 8.7 and the calculated weight solids are 55.975%. Salt fog (5%) resistance=96 hours an O2 panels air dried at ambient temperatures. Panel is cured at 200° F. (5% NaCl) sort fog=1272 hours.

Example 5

(Reference B1346—19)

A formulation using the same equipment and procedures as in Example 1. This example is to be a comparison with other examples and uses conventional metal salt driers and no carbodiimide driers. 21.358 parts of Kelsol 3961 resin, 0.828 parts of HH4OH; 5.523 parts of a penn color black dispersion, 13.806 parts of a chromate pigment, 35.621 parts of an acrylic copolymer, 0.276 parts of anti-foam agent, 1.602 parts of a high boiling filming aid, 0.138 parts of a 12% active cobalt drier, 0.138 parts of a 6% zirconium drier, 13.806 parts of water and 6.903 parts of a medium boiling cosolvent. This produces a paint having a pigment to binder ratio of 1 to 2 and a calculated total solids by weight of 49.65%. Samples prepared for testing as in other examples an cold rolled steel (O2-pounds). All samples air dried at ambient temperatures seven (7) days and then cured 5 minutes at 200° F. in the oven. Samples put in 5% NaCl salt fog box and the 100% relative humidity cabinet at 110° F. Samples removed from salt fog cabinet after 96 hours exposure, coatings had blistered and rusted in 48 hours. Samples removed from the humidity cabinet after 1,104 hours exposure, no blistering or rusting evident on these panels.

Examples 6, 7 and 8

(Reference B1346—33A, B & C)

These are high solids systems that are formulated using a slow speed mixer that has high torque. These examples are to demonstrate and prove the reactivity of the polycarisodiimide driers in high solids alkyd, polyester systems and also the scope of the drying possibilities that have not before been possible with the alkyd coatings. Anyone skilled in the art of alkyd, polyester, acrylic or other polymers used for coatings containing carboxyl groups will readily recognize the many possibilities and advantages of the carbodiimide, polycarbodiimide and substituted carbodiimide driers or cross linking agents (6). A formulation containing 91.591 parts of a Cargil high solids alkyd number 5720, 0.814 parts of an alkynolamine, 0.680 parts of a cobalt salt drier, 0.769 parts of a Zirco drier, 2.661 parts of a calcium acid salt drier and 3.485 parts of a polycarbodiimide drier produced by Union Carbide Corporation under the name UNEL-XL20.

This gives a product that is 66.1% solids and a 3 mil film air dried to touch in 10 minutes. Pot life remains good after 7 months.

(7) A formulation containing 93.214 parts of Cargil resin number 5720, 0.829 parts of an alkanolamine, 0.692 parts of cobalt drier, 0.783 parts of Zirco drier, 2.708 parts of calcium drier and 1.775 parts of polycarbodiimide drier. This gives a system that is cobalt 67.3% weight solids the pot life or storage stability at ambient room temperature are good at 7 months. A 3 mil wet film cured to touch in 20 minutes at ambient room temperatures.

(8) A formulation containing 96.335 parts of Cargil resin number 5720 and 3.665 parts of a polycarbodiimide. This system is about 69.3% weight solids and jelled in 30 seconds. This film cured to touch in 60 seconds at ambient room temperatures.

Examples 9, 10 and 11

(Reference B1346—65 A, B and C)

These three examples demonstrate the advantages of using the polycarbodiimide driers in already commercial, water dilutable alkyd paint systems by the post addition of the polycarbodiimide driers. However, no commercial sales or public publications have been made to the inventors knowledge at the time of this patent memorandum accomplishment. These examples were prepared by taking a clear product similar to that produced according to Example 1 of co-pending U.S. Ser. No. 382,853 (a commercial product of Ashland Petroleum Company) and the corresponding black-pigmented product (a commercial product) and adding the polycarbodiimide at the proper levels to the coatings and recording the drying times and hardness levels of the coatings.

Example 9

Clear, (Batch No. 6E03332)

Films are prepared on O2-panels using a draw down bar with a 5 mil spacing.

| No. | Drying Conditions | Tack to Touch | Pencil Hardness |
|---|---|---|---|
| 1 | Ambient Room Temperatures | 40 minutes tack free | 6B+ |
| 2 | Oven 245° F.–250° F. | 4 minutes tack free | 4B |
| 3 | Oven 245° F.–250° F. | 3 minutes tacky | 6B+ |
| 4 | 3 minutes at 250° F. and 16 hours at ambient temperature | tack free | F |

Example 10

Clear, Batch Number 6E03332

89.127 parts and polycarbodiimide 10.873 parts; test panels are prepared as in Example 9.

| No. | Drying Conditions | Tack to Touch | Pencil Hardness |
|---|---|---|---|
| 1 | Ambient Room Temperatures | tack free 20 minutes | 6B+ |
| 2 | oven at 245° F.–250° F. | tack free 3 minutes | B |
| 3 | oven at 245° F.–250° F. three minutes and 16 hours at ambient temperature | tack free | 2H |

Example 11

Black, Batch Number 2E02790

100,000 parts as in Example 9.

| No. | Drying Conditions | Tack to Touch | Pencil Hardness |
|---|---|---|---|
| 1 | ambient room temperatures | 50 minutes tack free | 6B+ |
| 2 | ambient room temperatures | 16 hours tack free | 5B |
| 3 | oven at 245° F.–250° F. | 3 minutes tack free | 5B |

Examples 12, 13 and 14 continue the testing using the formulation of Example 1 pigmented with black and stanley red.

Example 12

Reference B1346-13 66D, E and F

Using the formulation of Example 1, pigmented with black, batch number 2E02790, 89.127 parts and 10.873 parts of polycarbodiimide; test panels are prepared as in Example 9.

| No. | Drying Conditions | Tack to Touch | Pencil Hardness |
|---|---|---|---|
| 1 | ambient room temperatures | 20 minutes tack free | 6B |
| 2 | ambient room temperatures | 16 hours tack free | HB |
| 3 | oven 245° F.–250° F. | 3 minutes tack free | B |
| 4 | oven 345° F.–350° F. | 1 minute tack free | HB |
| 5 | oven 345° F.–350° F. | 2 minutes tack free | 2H |
| 6 | oven 345° F.–350° F. | 10 minutes tack | 3H |

-continued

| No. | Drying Conditions | Tack to Touch | Pencil Hardness |
|---|---|---|---|
| | | free | |

Example 13

Using the formulation of Example 1, pigmented with stanley red batch number 7-278C, 100.00 parts, test samples are prepared as in Example 9.

| No. | Drying Conditions | Tack to Touch | Pencil Hardness |
|---|---|---|---|
| 1 | ambient room temperatures | 40 minutes tack free | 6B+ |
| 2 | oven 245° F.–250° F. | 3 minutes tacky | 6B+ |
| 3 | oven 245° F.–250° F. | 5 minutes tack free | 5B |

Example 15

Using the formulation of Example 1, pigmented with stanley red batch number 7-278C 89.127 parts and 10.873 parts polycarbodiimide, test samples are prepared as in Example 9.

| No. | Drying Conditions | Tack to Touch | Pencil Hardness |
|---|---|---|---|
| 1 | ambient room temperatures | 15 minutes tack | 4B |
| 2 | oven 245° F.–250° F. | 3 minutes tack free | H |
| 3 | oven 345° F.–350° F. | 1 minute tack free | 2H |

Examples 15–24

When additional formulations are made and tested according to the techniques of Example 1, formulations and test results are as set forth in Table I.

TABLE I

| Example | Formulation | Percent of Total Wgt. | Substrate | Thickness Mils Wet | Ambient Air Cure | 270° F. Cure | Test Results Pencil Hardness ASTM D3363-74 |
|---|---|---|---|---|---|---|---|
| 15 | Spencer Kellogg Alkyd #252-MA1-60 | 52.72 | (CRS) | 3 | 15 Min. | — | 6B+ Soft |
| | DMEA | 6.33 | | | 16 Hrs. | — | F |
| | Water | 31.64 | | | — | 1 Min. | 6B+ |
| | Butyl Cellosolve | 7.91 | | | — | 2 Min. | B |
| | Cobolt Drier | 0.79 | | | — | 6 Min. | HB |
| | Active 8 Driver | 0.59 | | | | | |
| 16 | SK Alkyd (95-110)* #252 MA160 | 42.15 | CRS | 3 | 12 Min. | — | 6B+ Soft |
| | DMEA | 6.32 | | | 16 Hrs. | — | B |
| | Water | 25.29 | | | — | 1 Min. | B |
| | Butyl Cellosolve | 6.32 | | | — | 2 Min. | B |
| | UNEL XL-20 (50%) | 19.92 | | | 16 Hrs.+ | 2 Min. | H |
| 17 | SK Alkyd (95-110)* #252 MA160 | 49.55 | CRS | 3 | 12 Min. | — | 6B+ Soft |
| | DMEA | 7.43 | | | 16 Hrs. | — | B |
| | Water | 29.73 | | | — | 1 Min. | B |
| | Butyl Cellosolve | 7.43 | | | — | 2 Min. | B |
| | UNEL XL-20 (50%) | 5.85 | | | 16 Hrs.+ | 2 Min. | HB |
| 18 | Cargill Alkyd XP-10511-222 (41.4)* | 54.49 | CRS | 3 | 140 Min. | — | 6B+ Soft |
| | DMEA | 2.73 | | | 16 Hrs. | — | 2B |
| | Water | 33.07 | | | — | 5 Min. | 3B |
| | Butyl Cellosolve | 8.27 | | | 16 Hrs.+ | 5 Min. | 2B |
| | Cobolt Drier | 0.83 | | | | | |
| | Active 8 Driver | 0.62 | | | | | |
| 19 | Cargill Alkyd XP-10511-222 (41.4)* | 49.44 | CRS | 3 | 37 Min. | — | 6B+ Soft |
| | DMEA | 3.38 | | | | 2 Min. | 4B |
| | Water | 30.00 | | | 16 Hrs. | 2 Min. | 3B |
| | Butyl Cellosolve | 7.50 | | | | | |
| | UNEL XL-20 (50%) | 9.68 | | | | | |
| 20 | Cargill Alkyd XP-10511-222 (41.4)* | 53.31 | CRS | 3 | 9 Hrs. | — | 6B+ Soft |
| | DMEA | 3.64 | | | | 40 Min. | 6B+ Soft |
| | Water | 32.36 | | | | 16 Hrs. | 5B |
| | Butyl Cellosolove | 8.09 | | | | | |
| | UNEL XL-20 (50%) | 2.61 | | | | | |
| 21 | Cargill Alkyd XP-10511-221 (20.8)* | 55.52 | CRS | 3 | 80 Min. | — | 6B+ Soft |
| | DMEA | 1.38 | | | 16 Hrs. | — | F |
| | Propasol-P | 41.64 | | | — | 10 Min. | 6B+ Soft |
| | Cobolt Drier | 0.83 | | | | 20 Min. | B |
| | Active 8 Drier | 0.62 | | | | 16 Hrs. | F |
| 22 | Cargill Alkyd XP-10511-221 (20.8)* | 53.16 | CRS | 3 | 45 Min. | — | 6B+ Hard |
| | DMEA | 1.79 | | | 16 Hrs. | — | 3B |
| | Propasol-P | 39.87 | | | — | 10 Min. | 6B Hard |
| | UNEL XL-20 (50%) | 5.18 | | | | | |
| 23 | Aropol Polyester 8321 (31-37) | 99.97 | CRS | 3 | — | 5 Min. @ 260° F. | B Hard |
| | Benzoyl Peroxide | 0.03 | | | | | |
| 24 | Aropol Polyester 8321 (31-37) | 82.07 | CRS | 3 | — | 3 Min. @ 260° F. | B Hard |
| | Benzoyl Peroxide | 0.02 | | | | | |
| | UNEL-XL20 | 17.91 | | | | | |

*Acid Number
CRS = Cold Rolled Steel

| 4 | oven 245° F.–250° F. 3 minutes plus 16 hours ambient temperatures | tack free | B |

MODIFICATIONS

It will be understood by those skilled in the art that the invention is not to be restricted by the examples which merely illustrate the invention and that the invention is susceptible to a wide variety of modifications and variations without departing from the spirit thereof. For example, the formulations of the invention can be prepared as concentrates to which a substantial amount of water can be added in order to avoid shipping of water, particularly for international or other long distance shipment. The formulations may contain other useful ingredients such as biocides, anti-foam agents, pigments, dyes and leveling agents, well known to those skilled in coatings technology.

All references mentioned above and the references cited therein are hereby incorporated by reference.

Specific compositions, methods, or embodiments discussed are intended to be only illustrative of the invention disclosed by this Specification. Variation on these compositions, methods, or embodiments are readily apparent to a person of skill in the art based upon the teachings of this Specification and are therefore intended to be included as part of the inventions disclosed herein.

What is claimed is:

1. A controllable drying-time, water-based or organic solvent-based alkyd composition which dries rapidly at ambient temperature without substantial evolution of gaseous by-products and is capable of application and flow on a solid substrate, comprising:
   (A) about 0.1 to 40.0% by weight of a drying agent selected from the group comprising carbodiimides, polycarbodiimides and substituted polycarbodiimides;
   (B) about 60 to 99.5% by weight of an organic carboxylate selected from the group comprising alkyds, polyesters, acrylics, epoxides, phenolics, modified acrylics, modified vinyls and urethanes; said carboxylate being present in at least the stochiometric quantity required to react with said drying agent;
   (C) about 0 to 90.0% by weight of a solvent selected from the group consisting of water, and organic solvents;

2. A composition according to claim 1 further comprising:
   (A) about 0.1 to 10% by weight of a coupling agent selected from the group consisting of dialky alkyamines, glycol ethers, butylcellosolve, sorbitan diethylene glycol monoethyl ether, ethylene glycol monopropyl ether.

3. A composition according to claim 1 comprising:
   (A) 0.5 to 15% by weight of said drying agent,
   (B) 15 to 60% by weight of said organic carboxylate
   (C) 20 to 80% of said solvent;

4. A composition according to claim 1 comprising:
   (A) 1 to 10% by weight of said drying agent;
   (B) 20 to 35% by weight of said organic carboxlate; and
   (C) 30 to 60% by weight of said solvent.

5. A composition according to claim 1 wherein said organic carboxylate comprises a long oil alkyd having a triglyceride content in the range of about 59 to 85% by weight.

6. A composition according to claim 1 wherein said organic carboxylate comprises a medium oil alkyd having a triglyceride content in the range of about 48 to 58 percent by weight.

7. A composition according to claim 1 which dries tack-free at 24° C. (75° F.) in less than about 20 minutes, said organic carboxylate comprising a short oil alkyd having a triglyceride content in the range of about 33 to 47% by weight.

8. A method of producing an anti-corrosive, controllable drying-time, water-based or organic solvent-based alkyd composition which dries rapidly at ambient temperature without substantial evolution of gaseous by-products and is capable of application and flow on a solid substrate, said method comprising the following steps:
   (A) mixing and and in an essentially fluid state a drying agent selected from the group comprising carbodiimides, polycarbodiimdes and substituted polycarbodiimides;
   (B) an organic carboxylate selected from the group comprising alkyds, polyesters, acrylics, epoxides, phenolics, modified acrylics, modified vinyls and urethanes; said carboxylate being present in at least the stochiometric quantity required to react with said drying agent;
   (C) a substantial quantity of water or an organic solvent;
   (D) neutralizing to a pH of about 7 to 11 with amine;
   (E) adding water or organic solvent with agitation at such temperatures so as to cause dispersion of the mixture; and
   (F) adjusting the pH of the total mixture from about 7 to about 11.

9. A method for coating metal substrates wherein said composition of claim 1 is applied thereto.

10. A method for coating solid substrates wherein said composition of claim 1 is applied thereto by dipping.

11. A method for coating solid substrates wherein said composition of claim 1 is applied thereto by brushing.

12. A method for coating solid substrates wherein said composition of claim 1 is applied thereto by rolling.

13. A method for coating solid substrates wherein said composition of claim 1 is applied thereto by electrostatic spraying.

14. A method for coating solid substrates wherein said composition of claim 1 is applied thereto by hand spraying.

15. A manufacture comprising a substrate coated with a coating composition of claim 1.

16. A composition according to claim 1 comprising:
   (A) about 0.5 to 25 percent of component A;
   (B) about 5 to 10 percent of component B; and
   (C) about 0 to 90 percent of component C.

17. A composition according to claim 1 comprising:
   (A) about 1 to 15 percent of component A;
   (B) about 8 to 12 percent of component B; and
   (C) about 0 to 90 percent of component C.

* * * * *